United States Patent [19]
Dawson et al.

[11] 3,890,162
[45] June 17, 1975

[54] THERMOCOUPLES

[75] Inventors: Gordon William Dawson, Colliers End, Near Ware; Howard Meredith Dixon, Chestnut, both of England

[73] Assignee: Sangamo Weston Limited, Enfield, Middlesex, England

[22] Filed: June 6, 1973

[21] Appl. No.: 367,415

[30] Foreign Application Priority Data
June 27, 1972 United Kingdom.............. 30080/72

[52] U.S. Cl................................ 136/230; 136/233
[51] Int. Cl.............................................. H01v 1/02
[58] Field of Search...................... 136/230, 40, 235

[56] References Cited
UNITED STATES PATENTS
2,186,707  1/1940  Ray..................................... 136/233
3,516,873  6/1970  Bonkowski et al. ................ 136/230
3,753,787  8/1973  Webb.................................. 136/230

Primary Examiner—Verlin R. Pendegrass
Attorney, Agent, or Firm—Hill, Gross, Simpson, Van Santen, Steadman, Chiara & Simpson

[57] ABSTRACT

A thermocouple sensing element, particularly a mineral insulated thermocouple element, is mounted in a protective sheath in such a way that it is resiliently supported along its length and will not fracture upon differential expansion of the parts of the assembly. The thermocouple element preferably has a helical support around it and along a substantial part of its length. The support may comprise a helically wound wire secured around a braid which provides a cushioning effect against vibration.

5 Claims, 2 Drawing Figures

THERMOCOUPLES

FIELD OF THE INVENTION

This invention relates to thermocouples, and is particularly concerned with the mounting of thermocouple sensing elements, especially mineral insulated thermocouple elements, within protective sheaths.

DESCRIPTION OF THE PRIOR ART

Advances in aircraft engine design in particular have brought about requirements for small thermocouples which are able to withstand severe vibration specifications. This has led to the use of mineral insulated thermocouple elements instead of the more conventional thermocouple elements formed from bare wire with ceramic insulation. It has previously been the practice to support mineral insulated thermocouple elements inside a protective outer sheath by the use of solid ferrule supports spaced at intervals along the thermocouple element and acting as distance pieces between the thermocouple element and the outer sheath. However, the use of such solid ferrule supports has proved to be unsatisfactory due to fracturing of the thermocouple element from the effects of vibration and temperature cycling.

A further problem with the methods of mounting the thermocouple elements in their protective sheaths in the conventional way results from differential expansion between the parts of the assembly. In conventional thermocouples using mineral insulated thermocouple elements it has been necessary to choose materials for the mineral sheath around the wires on the one hand and for the outer protective sheath on the other hand which are compatible with regard to their coefficients of expansion at varying temperatures.

SUMMARY OF THE INVENTION

It is an object of the present invention to provide a thermocouple, particularly using a mineral insulated thermocouple sensing element, which overcomes these problems and which provides a resilient support for the thermocouple sensing element to guard against fracture of the element due to vibration or temperature effects.

It is a further object of the invention to provide a thermocouple in which the thermocouple element is supported in a way which will absorb the effects of differential expansion of the parts of the assembly upon changes in temperature.

It is yet another object of the invention to provide a thermocouple mounting which is equally applicable to use with mineral insulated thermocouple sensing elements and to use with conventional ceramic insulated thermocouple elements.

In accordance with one aspect of the present invention there is provided a thermocouple comprising an elongate thermocouple sensing element carried coaxially within a tubular protective sheath, and support means between said sensing element and said sheath to maintain the concentricity thereof, said support means being resilient, providing continuous support for the sensing element along at least a substantial part of its length, and permitting relative axial movement between the sensing element and the sheath in response to differential thermal expansion thereof.

In accordance with another aspect of the invention there is provided a thermocouple comprising an elongate thermocouple sensing element carried coaxially within a tubular protective sheath, and support means between said sensing element and said sheath to maintain the concentricity thereof, said support means being secured on the one hand to the sensing element to provide continuous support for the sensing element along at least a substantial part of its length, and being secured on the other hand to said sheath at only one axial position.

Preferably, the support means comprises a helically wound wire secured at each end to the thermocouple element. In addition, a braid, preferably a wire braid of the multi-plait type, may be provided along the supported length of the thermocouple element between the element and the wire to provide a cushioning effect when the assembly is subject to vibration.

The invention also includes a method of mounting a mineral insulated thermocouple sensing element within a tubular protective sheath which comprises:
a. securing an annular ferrule to the sensing element adjacent to the end remote from the sensing tip,
b. wrapping a wire braid around the sensing element over at least a substantial part of its length between the ferrule and the sensing tip,
c. winding a wire helically around the braid to overlie the braid,
d. securing the braid and wire to the sensing element at each end of the wire helix,
e. fitting the said assembly as a push fit into a tubular protective sheath with the wire in contact with the internal surface of the sheath, and
f. securing the ferrule only to the sheath.

BRIEF DESCRIPTION OF THE DRAWINGS

In order that the invention may be fully understood, a description of a preferred embodiment of thermocouple is now given by way of example and with reference to the accompanying drawing, in which.

DESCRIPTION OF THE PREFERRED EMBODIMENT

Figure 1:
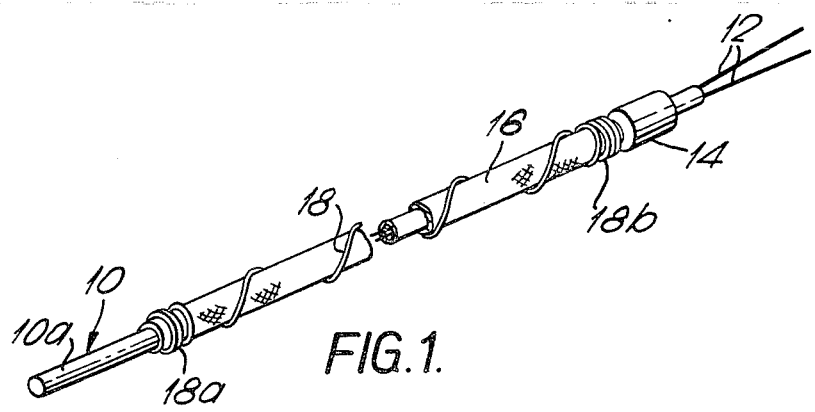
FIG. 1 is an isometric view of the thermocouple sensing element assembly in accordance with the invention without the outer protective sheath; and, FIG. 2 is a longitudinal sectional view of the thermocouple sensing element assembly of FIG. 1 positioned within its protective outer sheath.

The drawing shows a thermocouple sensing element 10 which is preferably of the mineral insulated type, although as will be described later it can alternatively be of a ceramic insulated type. The thermocouple element 10 has a sensing tip 10a at one end thereof, and at the end remote from the sensing tip 10a there extend wires 12 for connection to suitable recording and/or indicating apparatus. An annular support ferrule 14 is crimped to the thermocouple element 10 adjacent to the end remote from the sensing tip 10a. A braid 16, preferably a wire braid of the multi-plait type, is cut to the length to which the element 10 needs support, and is then fitted over the thermocouple element 10 so that one end of the braid 16 rests against the ferrule 14. In the embodiment shown in the drawing the braid extends along approximately three-quarters of the length of the thermocouple element. The lay of the braid 16 is adjusted so that the braid fits snugly around the element 10. A binding wire 18 is then wrapped around the braid 16, the braid being bound into position on the thermocouple element 10 adjacent to the sensing tip 10a by a few close-wound turns 18a of the binding wire 18, after which the pitch of the binding wire is increased to give a helically wrapped assembly. The binding is terminated at the other end of the braid 16 by more close-wound turns 18b which butt against the support ferrule 14.

Brazing is then carried out at each area of the close-wound turns 18a and 18b of the binding wire 18 so that the thermocouple element 10, the braid 16, and the binding wire 18 are joined together at these two areas. In addition, the thermocouple element 10 itself is also brazed to the support ferrule 14.

Figure 2:
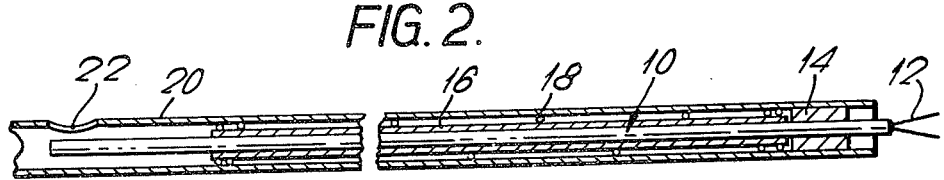

The dimensions of the braid 16 and of the binding wire 18 are selected so that the assembly is then a good push fit into a protective tubular outer sheath 20 which carries the assembly. As shown in FIG. 2 the thermocouple element assembly is pushed into the sheath 20 so that the sensing tip 10a of the thermocouple element lies adjacent to a window 22 in the sheath 20. When correctly positioned in the sheath 20 the thermocouple element assembly is located in position by joining the ferrule 14 only to the sheath 20. The remainder of the length of the thermocouple element assembly is thus supported within the sheath 20 only by the contact between the binding wire 18 and the sheath.

This method of mounting the thermocouple element within the protective outer sheath has several distinct advantages. It provides continuous support for the thermocouple element 10 along its length. The support is sufficiently resilient to accommodate minor dimensional variations of the sheath 20 and also to give a cushioning effect due to the strands of the braid 16 when subject to vibration. Differential expansion between the sheath 20 and the thermocouple element 10 due to temperature gradients is accommodated by minor axial movements of the element 10 within the sheath 20, and these minor axial movements can take place without any danger of fracture or distortion of the thermocouple element. Moreover, the metals which are chosen for the supporting means on the one hand and for the outer sheath on the other hand may be selected without having to match their temperature coefficients of expansion.

Although FIGS. 1 and 2 show a mineral insulated thermocouple element 10, the present invention is also applicable to the use of a ceramic insulator as an alternative to mineral insulation. With the use of a ceramic insulator the support braid 16 and the binding wire 18 are the same as in the embodiment described above, with the thermocouple wires 12 threaded through holes in the ceramic and with the hot junction of the thermocouple element being at a point corresponding to the sensing tip 10a but outside the ceramic insulation. Thus, with a ceramic insulator the supporting means comprising the braid 16, the binding wire 18 and the ferrule 14 perform the same function as in the embodiment described above and likewise are a push fit in an outer protective sheath for the assembly.

Although those versed in the art may suggest various minor modifications it should be understood that we wish to embody within the scope of the patent warranted hereon all such modifications as reasonably and properly come within the scope of the invention and our contribution to the art.

We claim:

1. A thermocouple comprising a tubular protective sheath, an elongate sensing element positioned coaxially within said sheath with a thermojunction at one end of the element within the sheath, and support means between the sensing element and the sheath, said support means having uninterrupted contact both with the sheath and with the sensing element over a substantial part of the length of the sensing element, being yieldable radially of the sensing element to provide a resilient cushioning effect along the supported length of the sensing element, and permitting relative axial movement between the sensing element and the sheath in response to differential thermal expansion of the sensing element and the sheath.

2. A thermocouple as claimed in claim 1, in which there is a single common point of securement of said sensing element to said support means and of said support means to said sheath at a position axially remote from said one end of the sensing element.

3. A thermocouple as claimed in claim 1, in which said support means is secured to said sheath at only one position along the length of the support means.

4. A thermocouple as claimed in claim 1, in which said support means is secured to said sensing element only adjacent to each end of said support means.

5. A method of mounting a mineral insulated thermocouple sensing element within a tubular protective sheath which comprises:
 a. securing an annular ferrule to the sensing element adjacent to the end remote from the sensing tip in fixed relationship to the element,
 b. wrapping a wire braid around the sensing element in snug fit relationship thereto over at least a substantial part of its length between the ferrule and the sensing tip,
 c. winding a wire helically around the braid with close space windings adjacent either end of the braid and wider spaced windings intermediate the ends to overlie the braid,
 d. fixedly securing the braid and wire to the sensing element only at each end of the wire helix,
 e. fitting the said assembly as a push fit into a tubular protective sheath with the wire in contact with the internal surface of the sheath, and
 f. permanently securing only the ferrule to the sheath.

* * * * *